United States Patent
Park

(10) Patent No.: US 9,015,826 B2
(45) Date of Patent: Apr. 21, 2015

(54) MOBILE PLATFORM SECURITY APPARATUS AND METHOD

(75) Inventor: Jae Choon Park, Seoul (KR)

(73) Assignee: Pantech Co., Ltd., Seoul (KR)

(*) Notice: Subject to any disclaimer, the term of this patent is extended or adjusted under 35 U.S.C. 154(b) by 728 days.

(21) Appl. No.: 13/234,997

(22) Filed: Sep. 16, 2011

(65) Prior Publication Data
US 2012/0204255 A1    Aug. 9, 2012

(30) Foreign Application Priority Data
Feb. 8, 2011  (KR) .................. 10-2011-0011100

(51) Int. Cl.
G06F 12/14    (2006.01)
G06F 21/44    (2013.01)

(52) U.S. Cl.
CPC ..................................... G06F 21/44 (2013.01)

(58) Field of Classification Search
USPC ............ 726/18, 22; 713/187; 380/44, 47, 277
See application file for complete search history.

(56) References Cited

U.S. PATENT DOCUMENTS

| | | | |
|---|---|---|---|
| 8,032,764 B2 * | 10/2011 | Shankar et al. | 713/193 |
| 2004/0230801 A1 * | 11/2004 | Sueyoshi et al. | 713/172 |
| 2005/0135626 A1 * | 6/2005 | Ball et al. | 380/277 |
| 2005/0144138 A1 * | 6/2005 | Kamibayashi et al. | 705/57 |
| 2008/0114993 A1 * | 5/2008 | Shankar et al. | 713/193 |
| 2009/0013183 A1 * | 1/2009 | Sato et al. | 713/169 |
| 2009/0208005 A1 * | 8/2009 | Kusakawa et al. | 380/46 |
| 2009/0245509 A1 * | 10/2009 | Shimosato et al. | 380/28 |
| 2009/0307783 A1 * | 12/2009 | Maeda et al. | 726/30 |
| 2010/0128876 A1 * | 5/2010 | Yang et al. | 380/259 |
| 2011/0067097 A1 * | 3/2011 | Park et al. | 726/19 |
| 2011/0307697 A1 * | 12/2011 | Takata | 713/168 |
| 2012/0131354 A1 * | 5/2012 | French | 713/189 |
| 2013/0018797 A1 * | 1/2013 | Itoi et al. | 705/44 |

OTHER PUBLICATIONS

Shoutan et al, High-Performance Rekeying Processor Architecture for Group Key Management, Oct. 2009, IEEE, vol. 58, No. 10, pp. 1421-1434.*
Egan, Achieving Supercomputer Performance in a Low Pain Environment, 1990, IEEE, pp. 205-207.*

* cited by examiner

Primary Examiner — Christopher Brown
Assistant Examiner — Jenise Jackson
(74) Attorney, Agent, or Firm — H.C. Park & Associates, PLC

(57) ABSTRACT

A mobile platform security apparatus and method is provided. The apparatus may perform a security setting by generating a first authentication key, a second authentication key, and a third authentication key for each function called by an application program. The apparatus may store the first authentication key and an identifier for identifying the application program in a first storage unit, the second authentication key and the identifier in a secret domain of a second storage unit, and register the third authentication key and the identifier as a function parameter in the application program. Subsequently, if the function is called by the application program, the apparatus may determine values for the first authentication key, the second authentication key, and the third authentication key corresponding to the called function, and may perform authentication processing using the three authentication key values.

16 Claims, 7 Drawing Sheets

| APP_NAME 310 | FUNCTION_NAME | FIRST AUTHENTICATION KEY 320 |
|---|---|---|
| APP_X | FUNCTION_a | $K_{Xa}1$ |
| | FUNCTION_b | $K_{Xb}1$ |
| APP_Y | FUNCTION_a | $K_{Ya}1$ |
| | FUNCTION_c | $K_{Yc}1$ |
| | FUNCTION_d | $K_{Yd}1$ |
| APP_Z | FUNCTION_c | $K_{Zc}1$ |
| | FUNCTION_e | $K_{Ze}1$ |
| ⋮ | ⋮ | ⋮ |

| APP_NAME 410 | FUNCTION_NAME | SECOND AUTHENTICATION KEY 420 |
|---|---|---|
| APP_X | FUNCTION_a | $K_{Xa}2$ |
|  | FUNCTION_b | $K_{Xb}2$ |
| APP_Y | FUNCTION_a | $K_{Ya}2$ |
|  | FUNCTION_c | $K_{Yc}2$ |
|  | FUNCTION_d | $K_{Yd}2$ |
| APP_Z | FUNCTION_c | $K_{Zc}2$ |
|  | FUNCTION_e | $K_{Zc}2$ |
| ⋮ | ⋮ | ⋮ |

MOBILE PLATFORM SECURITY APPARATUS AND METHOD

CROSS-REFERENCE TO RELATED APPLICATION

This application claims priority from and the benefit under 35 U.S.C. §119(a) of Korean Patent Application No. 10-2011-0011100, filed on Feb. 8, 2011, which is incorporated herein by reference for all purposes as if fully set forth herein.

BACKGROUND

1. Field

This disclosure relates to a technology for protecting a mobile communication terminal from an abnormal or unintentional operation of an application program installed on a platform of the mobile communication terminal.

2. Discussion of the Background

Generally, a platform refers to a system environment that allows an application program to be executed. Recently, an open platform has been developed to provide users with various services for user convenience as well as profitability for various application developers providing these services.

If a number of developers upload applications, which may be developed in accordance with the open standard, on web sites providing similar features as the Apple® App Store$^{SM}$, users may be provided with various applications and services that may be conveniently downloaded and installed at a small or no cost to the user.

This open service environment may provide users with access to various services and applications as described above. However, the open service environment may be disadvantageous in that it may be open to a risk of data leakage of personal user data, virus infection, and fatal system errors that may be caused by malicious applications.

In other words, since an application may be designed to call an open platform application programming interface (API) in an open service environment, various problems may arise, such as data leakage of users, abnormal charging, and the like. For example, a user may install an application, which the user may believe to simply provide an alarm function. However, during use or after installation, the application may obtain a user's phonebook list by calling a platform API accessible to a user phonebook without the user's knowledge, and when a platform API that permits the use of a network is called, phonebook data may be leaked.

SUMMARY

Exemplary embodiments of the present invention provide a mobile platform security apparatus and method.

Additional features of the invention will be set forth in the description which follows, and in part will be apparent from the description, or may be learned by practice of the invention.

Exemplary embodiments of the present invention provide an authentication key generating unit to generate a first authentication key, a second authentication key, and a third authentication key corresponding to a function called by an application program; a first storage unit to store the first authentication key and an identifier to identify the application program; a second storage unit to store the second authentication key and the identifier; and an authentication information registering unit to register the third authentication key and the identifier as a function parameter in the application program.

Exemplary embodiments of the present invention provide a mobile platform security method using a non-transitory processor for authenticating a function of an application program in a mobile communication terminal, the method including generating a first authentication key, a second authentication key, and a third authentication key corresponding to a function called by an application program; storing the first authentication key and an identifier for identifying the application program in a first storage unit; storing the second authentication key and the identifier in a secret domain of a second storage unit; and registering the third authentication key and the identifier as a function parameter in the application program.

Exemplary embodiments of the present invention provide a mobile platform security method using a non-transitory processor for authenticating a function of an application program in a mobile communication terminal, the method including generating a first authentication key, a second authentication key, and a third authentication key, corresponding to a function called by an application program; registering the third authentication key and the identifier as a function parameter in the application program; comparing the authentication keys; and permitting access to the called function if the three authentication keys correspond to one another, and denying access to the called function if the three authentication keys do not correspond to one another.

It is to be understood that both foregoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is a diagram illustrating a first authentication key stored in the mobile platform security apparatus according to an exemplary embodiment of the invention.

DETAILED DESCRIPTION OF THE ILLUSTRATED EMBODIMENTS

Figure 1:
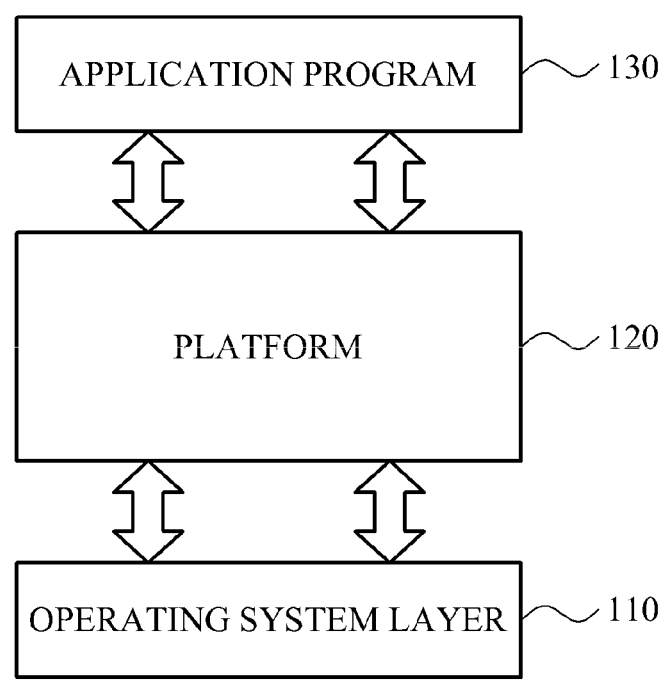
FIG. 1 is a block diagram illustrating a platform according to an exemplary embodiment of the invention.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity, illustration, and convenience.

Exemplary embodiments of the invention may provide a platform security apparatus and method for protecting a mobile communication terminal from an abnormal or unintentional operation of an application program installed on a platform of the mobile communication terminal.

FIG. 1 is a block diagram illustrating a platform according to an exemplary embodiment of the invention.

Referring to FIG. 1, platform 120 may be a software layer to provide an environment where an application program 130 may be installed and executed. The application program 130 installed on the platform 120 may be created or programmed using an application programming interface (API) provided by the platform 120.

The API may be a set of subroutines or functions that an application program may call to perform processing on an operating system (OS). In addition, the API may also refer to a set of functions defining a functionality of the OS and a method for using that functionality.

Accordingly, the application program 130, developed in accordance with a reference standard of the platform 120, may be operated regardless of an OS 110. That is, the application program 130 may access and execute a function on a file or a data domain managed by the OS 110 through API calling of the platform 120.

Figure 2:
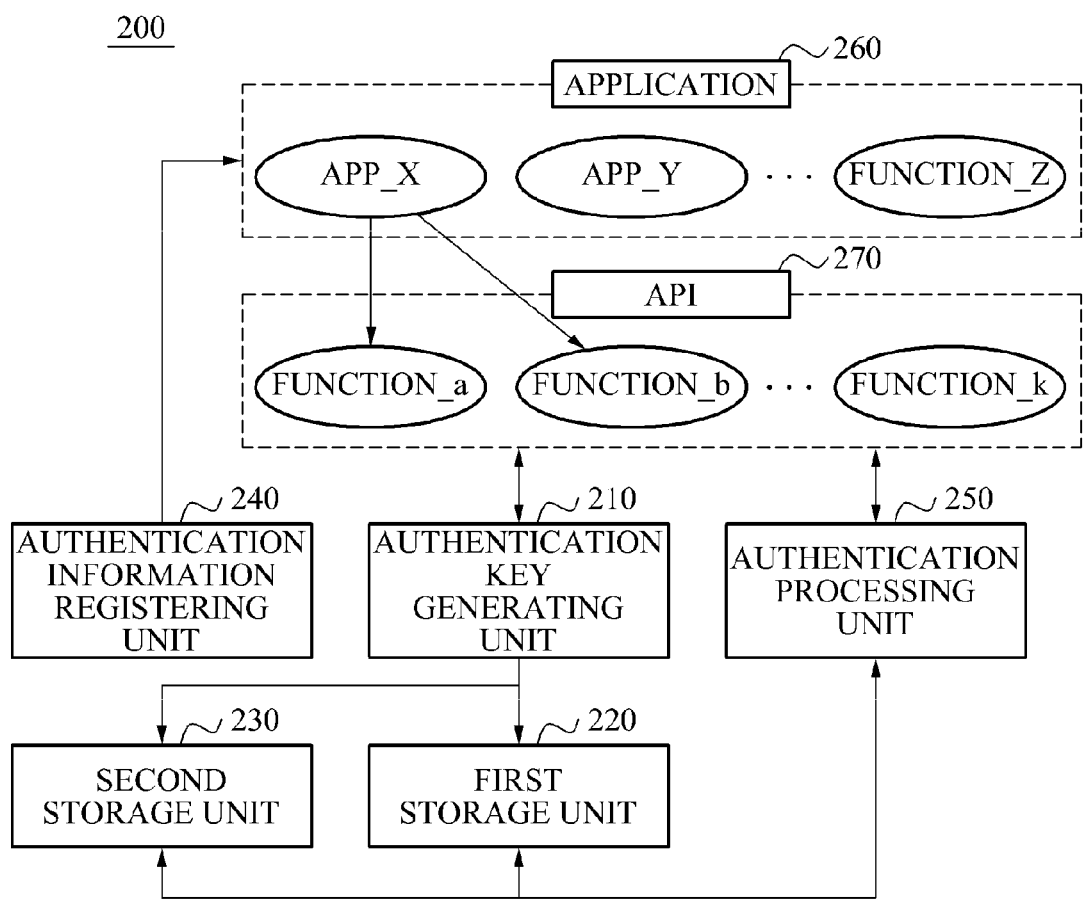
FIG. 2 is a block diagram illustrating a mobile platform security apparatus according to an exemplary embodiment of the invention.

FIG. 2 is a block diagram illustrating a mobile platform security apparatus according to an exemplary embodiment of the invention.

Referring to FIG. 2, the mobile platform security apparatus 200 may be made in a platform core of a mobile platform installed in a mobile communication terminal and the like. The mobile platform security apparatus 200 may limit or prevent the execution of a function or operation not authenticated by a user if a reference application program performs a plurality of functionalities. For example, the mobile platform security apparatus 200 may prevent an application program, which may simply provide an alarm function in a mobile communication terminal, from calling or accessing an API accessible to a phonebook and/or from reading or leaking phonebook data.

Referring again to FIG. 2, the mobile platform security apparatus 200 includes an authentication key generating unit 210, a first storage unit 220, a second storage unit 230, an authentication information registering unit 240, and an authentication processing unit 250. Further, one or more of the components of the mobile platform security apparatus 200 may interact with an application 260 and/or a platform API 270.

The authentication key generating unit 210 may generate three authentication keys, including a first authentication key, a second authentication key, and a third authentication key for each function called by an application program 260. The function called by the application program 260 may represent a functionality of the application program 260, and the called function may be a function of the platform API 270. As shown in FIG. 2, if a function_a and a function_b are called during execution of APP_X, the function_a and the function_b may each refer to a functionality of the APP_X.

Accordingly, three authentication keys may be generated for each function of the platform API 270. According to aspects of the invention, if APP_X is installed, the authentication key generating unit 210 may analyze a code of the APP_X to determine that function_a and function_b are being called. Accordingly, the authentication key generating unit 210 may generate authentication keys, $K_{Xa}1$, $K_{Xa}2$, and $K_{Xa}3$, corresponding to the function_a and authentication keys, $K_{Xb}1$, $K_{Xb}2$, and $K_{Xb}3$, corresponding to the function_b.

Further, without limitation, three authentication keys may also be generated if an application program is installed or if a user makes a selection through an option menu. The authentication key may be an arbitrary number, an arbitrary symbol, and/or combination thereof. According to aspects of the invention, a set of three authentication keys may be independently generated for each functionality or for each function, not to be overlapped with an authentication key used to call other functions. Also, the three authentication keys may be generated such that the three authentication keys have the same or similar values, so that the first authentication key, the second authentication key, and the third authentication key may have the same or similar values. Further, the three authentication keys may be generated such that the three authentication keys have different values, based on an authentication method of the authentication processing unit 250.

The first storage unit 220 may store an identifier of the application program and the first authentication key among the three authentication keys. According to aspects of the invention, the first storage unit 220 may be a file system, a system memory, or the like.

The second storage unit 230 may store the identifier of the application program and the second authentication key among the three authentication keys in a secret domain. According to aspects of the invention, the second storage unit 230 may be a system memory or other suitable secret domains. The second storage unit 230 may be used to prevent duplication and destruction of the first storage unit 220, and modification of the first authentication key.

Although the first storage unit 220 and the second storage unit 230 are illustrated in FIG. 2 as a feature of the mobile platform security apparatus 200, aspects are not limited thereto such that the first storage unit 220 and the second storage unit 230 may be external to the mobile platform security apparatus 200 and/or accessible via a wired and/or wireless communication network.

Also, the secret domain of the second storage unit 230 may be domain accessible, meaning that the data stored in the secret domain may be read and new data may be written, by at least one of the authentication key generating unit 210 and/or the authentication processing unit 250. In addition, according to aspects of the invention, the secret domain of the second storage unit 230 may be domain accessible only by the authentication key generating unit 210 or the authentication processing unit 250.

The identifier and the first authentication key stored in the first storage unit 220 may be accessed by at least one of the authentication key generating unit 210 and/or the authentication processing unit 250. In addition, according to aspects of the invention, the first storage unit 220 may be accessible only by the authentication key generating unit 210 or the authentication processing unit 250.

As shown in FIG. 2, the identifier of the application program is represented as APP_X, APP_Y, and the like. However, the representations of an identifier of the application programs are not limited to these examples.

For example, the identifier of the application program may also be a name of the application program, root directory of the application program, or the like. The generated authentication keys and the identifiers of the application program may be matched to correspond to each other and may be stored in the first storage unit 220 or the second storage unit 230 in a table form.

The authentication information registering unit 240 may register a third authentication key among three authentication keys and the identifier of the application program as a function parameter in the application program.

The authentication information registering unit 240 may record the generated third authentication key and the identifier of the application program in a reference data domain related to a code domain where the application program may be installed.

If the generated third authentication key and the identifier of the application program are added to the function parameter by the authentication information registering unit 240, the application program may call a function of the platform API 270 using the function parameter, including the generated third authentication key and the identifier of the application program.

FIG. 3 is a diagram illustrating a first authentication key stored in a mobile platform security apparatus according to an exemplary embodiment of the invention.

FIG. 3 illustrates an example of information stored in the first storage unit 220.

Referring to FIG. 3, a table 300 stores an identifier of an application program 310 column, a function column, and a first authentication key 320 column. The table 300 may include a name of the application program 310 (e.g., APP_X, APP_Y, and APP_Z), name of a function (e.g., Function_a, Function_b, Function_c), and the first authentication key 320 (e.g., $K_{Xa}1$, $K_{Xb}1$, $K_{Ya}1$, $K_{Yc}1$) generated for each application program. As seen in FIG. 3, the first authentication key 320 may correspond to each function of the application program 310.

According to aspects of the invention, even if both APP_X and APP_Y use a function_a, which may be the same function, an authentication key $K_{Xa}1$ may be assigned to the function_a of the APP_X and an authentication key $K_{Ya}1$ may be assigned to the function_a of the APP_Y. As described above, the name of an application program and the authentications key may be matched to correspond to each other and stored in the first storage unit 220.

Figure 4:
FIG. 4 is a diagram illustrating a second authentication key stored in the mobile platform security apparatus according to an exemplary embodiment of the invention.

FIG. 4 is a diagram illustrating a second authentication key stored in the mobile platform security apparatus 200 according to an exemplary embodiment of the invention.

Referring to FIG. 4, a table 400 stores an identifier of an application program 410 column, a function column, and a second authentication key column. The table 400 may include a name of the application program 410 (e.g., APP_X, APP_Y, and APP_Z), name of a function (e.g., Function_a, Function_b, Function_c), and the second authentication key 420 (e.g., $K_{Xa}2$, $K_{Xb}2$, $K_{Ya}2$, $K_{Yc}2$) generated for each application program, and/or each name and each functionality of a function. According to aspects of the invention, the identifier of the application program 410 and the second authentication key 420 may be stored in a secret domain of the second storage unit 230 in a table form as shown in FIG. 4.

Referring to the third key, the authentication information registering unit 240 may register the third authentication key among three authentication keys and the identifier of the application program as a function parameter in the application program.

The authentication information registering unit 240 may record the generated third authentication key and the identifier of the application program in a reference data domain related to a code domain where the application program may be installed.

If the generated third authentication key and the identifier of the application program are added to the function parameter by the authentication information registering unit 240, the application program may call a function or operation of the platform API 270 using the function parameter including the generated third authentication key and the identifier of the application program.

Figure 5:
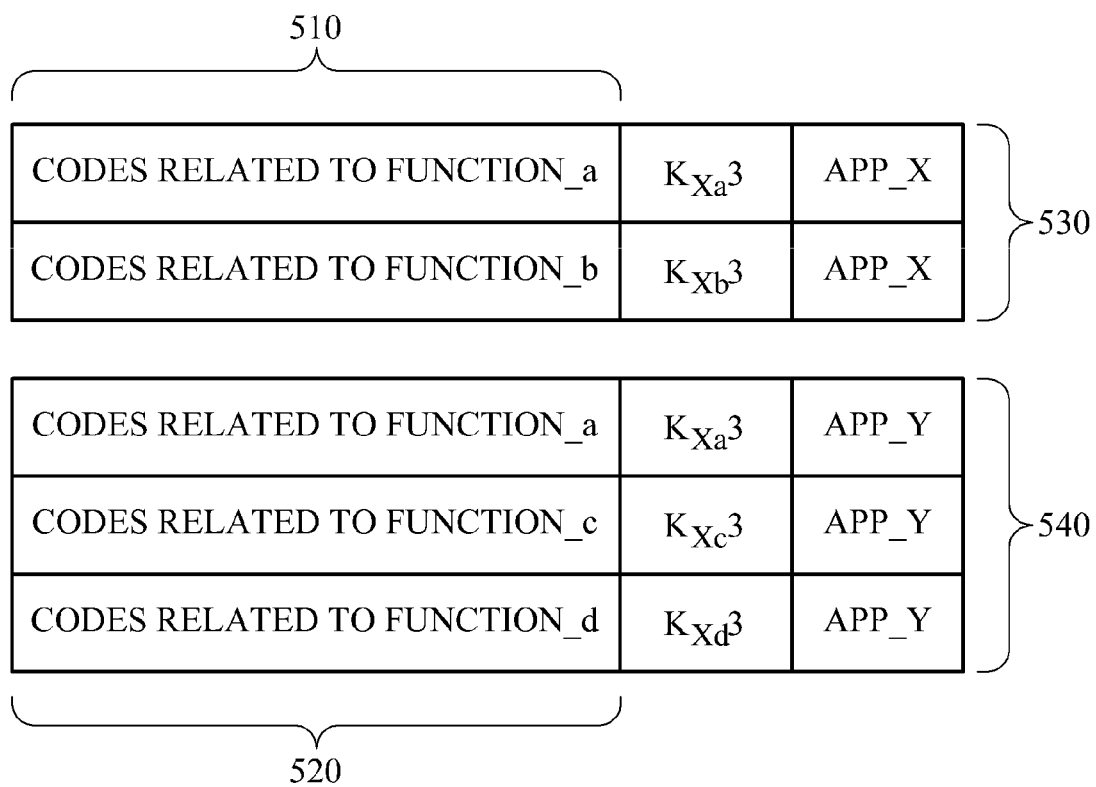
FIG. 5 is a diagram illustrating a function parameter registered in the mobile platform security apparatus according to an exemplary embodiment of the invention.

FIG. 5 is a diagram illustrating a function parameter registered in a mobile platform security apparatus according to an exemplary embodiment of the invention.

FIG. 5 may be an example of a generated third authentication key provided as a function parameter of an application program.

Referring to FIG. 5, a code domain 510 is a data domain where APP_X is installed, and a code domain 520 is a data domain where APP_Y is installed. Also, an additional domain 530 and an additional domain 540 may each represent the third authentication key (e.g., $K_{Xa}3$, $K_{Xb}3$, $K_{Xc}3$, $K_{Xd}3$) and the identifier of the application program (e.g., APP_X, APP_Y) registered as the function parameter. As described above, the authentication information registering unit 240 may register the third generated authentication key and the identifier of the application program in a reference data domain related to a code domain where the application program may be installed. Further, since the name of the application program may be determined using a return address of an API call, the identifier of the application program may also be registered by storing a location of the application program code during installation of the application program.

If a reference function is called by the application program, the authentication processing unit 250 may retrieve the third authentication key and the identifier included in the function parameter included in the application program, and determine whether the first authentication key and the second authentication key correspond with the third authentication key and/or the identifier to authenticate the function called by the application program. If the first authentication key and the second authentication key correspond to the third authentication key and/or the identifier, then the function called by the application program may be authenticated. The first authentication key corresponding to the identifier and the called function may be stored in the first storage unit 220. The second authentication key corresponding to the identifier and the called function may be stored in the second storage unit 230.

The authentication processing unit 250 may perform authentication processing by executing an authentication operation using two authentication keys among the first, second, and third authentication keys, and by comparing the authentication operation result with the remaining authentication key. That is, if the authentication operation result determines that the three authentication keys correspond to each other, the authentication processing unit 250 may determine successful authentication and may permit access to the called function. If one of the authentication key is determined to be different or not corresponding to the other authentication keys, the authentication processing unit 250 may determine that the authentication process has failed and may block access to the called function.

According to aspects of the invention, if the authentication operation is simply an addition (+) operation, which adds two authentication keys to equal to a third key, successful authentication may be determined if Equation 1 shown below is determined to be valid. Although aspects of the invention shows an addition operation as an authentication operation, the aspects of the invention is not limited thereto and may also use, as an authentication operation, an operation that does not estimate a value of the remaining authentication key using values of the two authentication keys.

$$\text{First authentication key} + \text{Second authentication key} = \text{Third authentication key} \quad [\text{Equation 1}]$$

If the first authentication key, the second authentication key, and the third authentication key are generated to have the same or similar values, the authentication processing unit 250 may determine the values of the first authentication key, the second authentication key, and the third authentication key, and determine whether the determined values of the first authentication key, the second authentication key, and the third authentication key are equal to each other. If the values of the authentication keys are all equal, the authentication processing unit 250 may determine the authentication process to be successful. If the authentication keys are not all equal, the authentication processing unit 250 may determine authentication process as having failed.

Hereinafter, a security method using the mobile platform security apparatus as described above is described with reference to FIG. 6 and FIG. 7 below.

Figure 6:
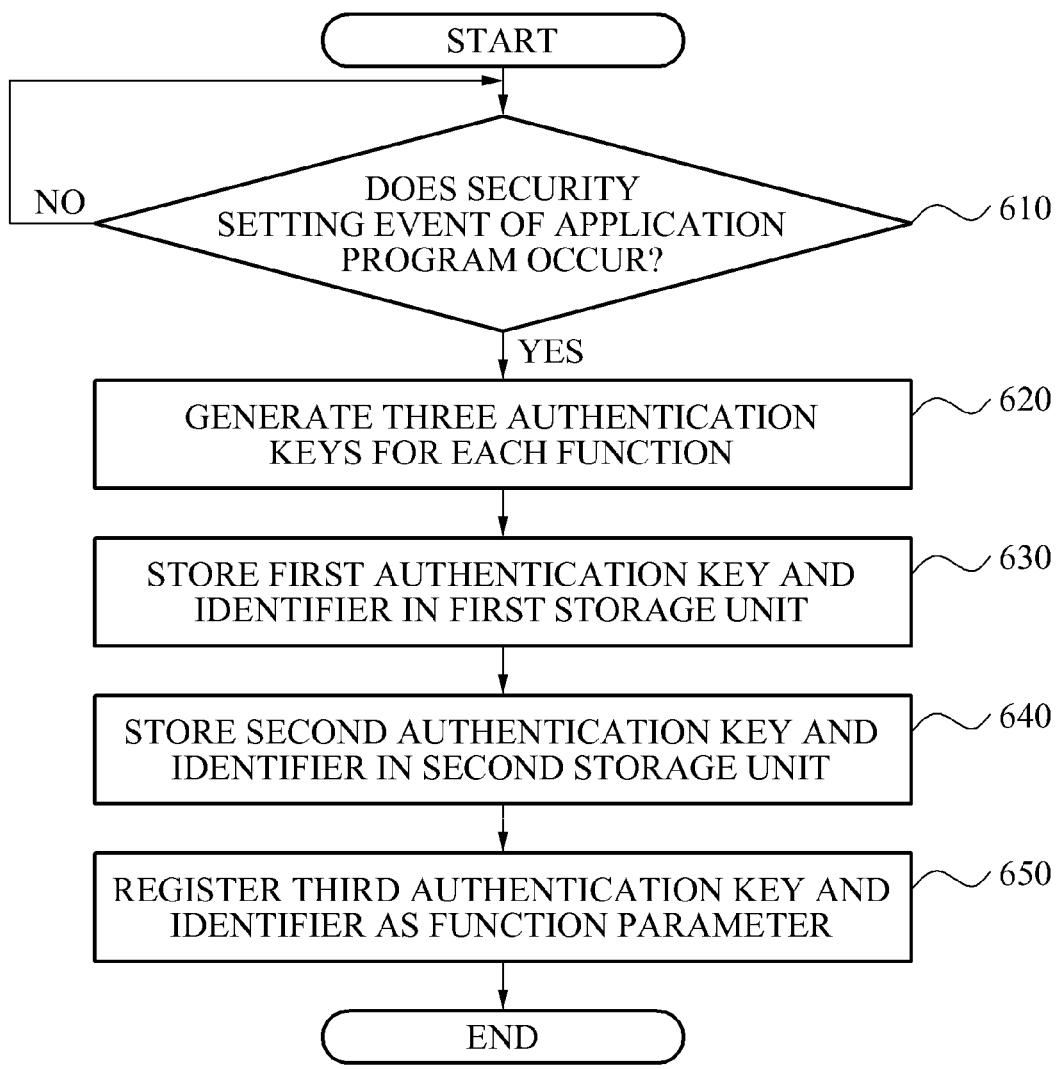
FIG. 6 is a flowchart illustrating a method for setting an authentication key of an application program in a mobile platform security apparatus according to an exemplary embodiment of the invention.

FIG. 6 is a flowchart illustrating a method for setting an authentication key of an application program in a mobile platform security apparatus according to an exemplary embodiment of the invention.

Referring to FIG. 6, if the mobile platform security apparatus 200 senses or detects a security setting event of an application program in operation 610, the mobile platform security apparatus 200 may generate three authentication keys for each function called by the application program in operation 620. According to aspects of the invention, the security setting event may occur while or after the application program is installed, or if a user makes a selection through an option menu. Also, the three authentication keys may be generated such that the three authentication keys have the same or similar values, so that a first authentication key, a second authentication key, and a third authentication key may be same or similar to each other. Further, the three authentication keys may be generated such that the three authentication keys have different values, based on an authentication method of the authentication processing unit 250.

In operation 630, the mobile platform security apparatus 200 may store the first authentication key and an identifier in the first storage unit 220.

In operation 640, the mobile platform security apparatus 200 may store the second authentication key and the identifier in a secret domain of the second storage unit 230. The secret domain of the second storage unit 230 may be domain accessible, such that the information stored in the domain may be readable and writable by at least one of the authentication key generating unit 210 and/or the authentication processing unit 250. In addition, according to aspects of the invention, the secret domain of the second storage unit 230 may be domain accessible only by the authentication key generating unit 210 or the authentication processing unit 250.

In operation 650, the mobile platform security apparatus 200 may register the third authentication key and the identifier as a function parameter in the application program.

Figure 7:
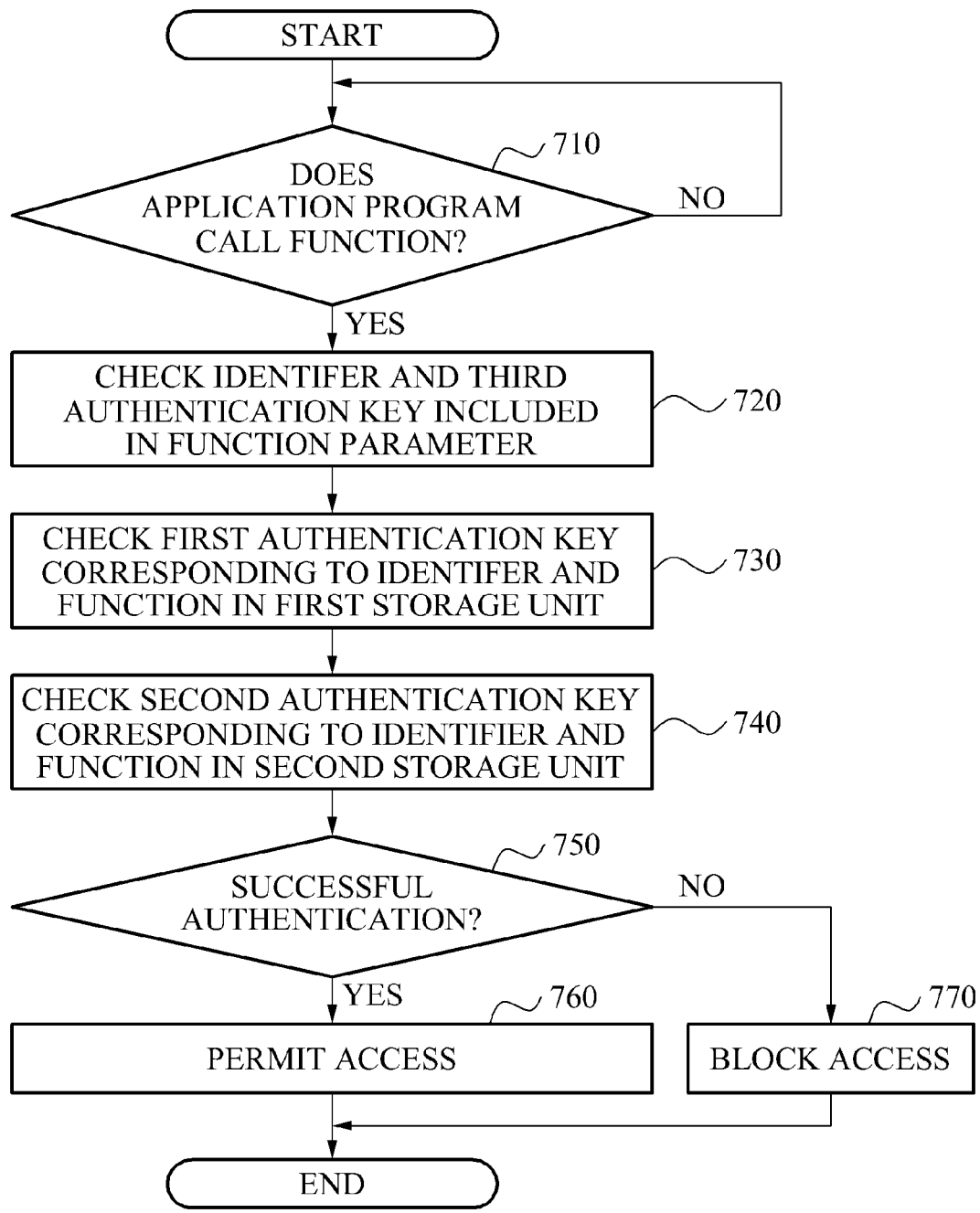
FIG. 7 is a flowchart illustrating a method for performing authentication, if a function of an application program is called, in a mobile platform security apparatus according to an exemplary embodiment of the invention.

FIG. 7 is a flowchart illustrating a method for performing authentication, if a function of an application program is called, in a mobile platform security apparatus according to an exemplary embodiment of the invention.

Referring to FIG. 7, if a function is called by an application program in operation 710, the mobile platform security apparatus 200 may retrieve the third authentication key and the identifier included in the function parameter in the application program in operation 720.

In operation 730, the mobile platform security apparatus 200 may determine the first authentication key corresponding to the identifier and the called function in the first storage unit 220.

In operation 740, the mobile platform security apparatus 200 may determine the second authentication key corresponding to the identifier and the called function in the second storage unit 230.

In operation 750, the mobile platform security apparatus 200 may perform authentication processing using the first authentication key, the second authentication key, and the third authentication key. Further, the mobile platform security apparatus 200 may determine whether successful authentication was achieved.

According to aspects of the invention, the mobile platform security apparatus 200 may perform authentication processing, by executing an authentication operation, using two authentication keys among the first authentication key, the second authentication key, and the third authentication key. More specifically, the mobile platform security apparatus 200 may perform authentication processing by comparing the authentication operation result of the two authentication keys with the remaining authentication key to determine whether the authentication operation result is equal or similar to the other authentication key. If the first authentication key, the second authentication key, and the third authentication key are generated to have the same or similar values, the mobile platform security apparatus 200 may determine that the values of the first authentication key, the second authentication key, and the third authentication keys are all equal. If the values of the first authentication key, the second authentication key, and the third authentication key are determined to be all equal, the mobile platform security apparatus 200 may determine successful authentication. If the values of the first authentication key, the second authentication key, and the third authentication key are not determined to be all equal, the mobile platform security apparatus 200 may determine that the authentication has failed.

If successful authentication is determined in operation 750, the mobile platform security apparatus 200 may permit access to the called function in operation 760.

If authentication is determined to have failed in operation 750, the mobile platform security apparatus 200 may block access to the called function in operation 770.

Exemplary embodiments of the present invention may generate three authentication keys for each function called by an application program. One among the three authentication keys may be generated as a function parameter. Two of the three authentication keys may be generated as a first authentication key and a second authentication key, which may be stored and be used to perform authentication.

Exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile platform security apparatus, comprising:
   an authentication key generator to generate a first authentication key, a second authentication key, and a third authentication key, wherein all of the three authentication keys are used to call the same function of an application program;
   a first memory storage to store the first authentication key and an identifier to identify the application program;
   a second memory storage to store the second authentication key and the identifier;
   an authentication information register to register the third authentication key and the identifier as a function parameter in the application program; and
   an authentication processor to retrieve the third authentication key and the identifier if the application program calls the function, to determine whether the first authentication key corresponds to the identifier and the called function in the first memory storage, to determine whether the second authentication key corresponds to the identifier and the called function in the second memory storage, and to perform authentication processing using the first authentication key, the second authentication key, and the third authentication key,
   wherein the second authentication key is stored in a secret domain of the second memory storage, and
   wherein the authentication processor:
     executes an authentication operation using two authentication keys among the first authentication key, the second authentication key, and the third authentication key;
     compares the authentication operation result with the remaining authentication key; and
     if the authentication operation result determines that the three authentication keys correspond to each other, permit access to the called function.

2. The apparatus of claim 1, wherein the identifier is stored in the secret domain of the second memory storage.

3. The apparatus of claim 1, wherein the secret domain of the second memory storage is accessible by at least one of the authentication key generator and the authentication processor.

4. The apparatus of claim 1, wherein the first authentication key and the identifier stored in the first memory storage are accessible by at least one of the authentication key generator and the authentication processor.

5. The apparatus of claim 1, wherein if the authentication operation result determines that the three authentication keys do not correspond to each other, blocks access to the called function.

6. The apparatus of claim 1, wherein the authentication key generator generates the first authentication key, the second authentication key, and the third authentication key to have the same value.

7. The apparatus of claim 6, wherein if the application program calls the function, the authentication key generator:
   determines the value of the third authentication key and the value of the identifier comprised in the function parameter;
   determines the value of the first authentication key corresponding to the value of the identifier and the called function in the first memory storage;
   determines the value of the second authentication key corresponding to the value of the identifier and the called function in the second memory storage; and
   if the first authentication key, the second authentication key, and the third authentication key have the same values, determine successful authentication, and
   if the first authentication key, the second authentication key, and the third authentication key have different values, determine failed authentication.

8. The apparatus of claim 1, wherein the authentication key generator generates the first authentication key, the second authentication key, and the third authentication key while or after the application program is installed or if a user selection is received.

9. A mobile platform security method using a non-transitory processor for authenticating a function of an application program in a mobile communication terminal, the method comprising:
   generating a first authentication key, a second authentication key, and a third authentication key, all of which are used to call the same function of an application program;
   storing the first authentication key and an identifier for identifying the application program in a first memory storage;
   storing the second authentication key and the identifier in a secret domain of a second memory storage unit;
   registering the third authentication key and the identifier as a function parameter in the application program;
   retrieving the third authentication key and the identifier if the application program calls the function;
   determining the first authentication key corresponding to the identifier and the called function in the first storage unit;
   determining the second authentication key corresponding to the identifier and the called function in the second storage unit; and
   performing authentication processing using the first authentication key, the second authentication key, and the third authentication key,
   the performing authentication processing comprises:
     executing an authentication operation using two authentication keys among the first authentication key, the second authentication key, and the third authentication key;
     comparing the authentication operation result with the remaining authentication key; and determining successful authentication and permitting access to the called function if the authentication operation result determines that the three authentication keys correspond to each other.

10. The method of claim 9, wherein the secret domain of the second memory storage is accessible only by the mobile platform security apparatus.

11. The method of claim 9, wherein the first authentication key and the identifier stored in the first memory storage are accessible only by the mobile platform security apparatus.

12. The method of claim 9, wherein the performing of authentication processing further comprises:
   determining failed authentication and blocking access to the called function if the authentication operation result determines that the three authentication keys do not correspond to each other.

13. The method of claim 9, wherein the generating of the first authentication key, the second authentication key, and the third authentication key comprises generating the first authentication key, the second authentication key, and the third authentication key to have the same value.

14. The method of claim 9, further comprising:
   if the application program calls the function, retrieving the value of the third authentication key and the value of the identifier comprised in the function parameter;
   determining the value of the first authentication key corresponding to the value of the identifier and the called function in the first memory storage;
   determining the value of the second authentication key corresponding to the value of the identifier and the called function in the second memory storage; and
   determining successful authentication if the first authentication key, the second authentication key, and the third authentication key have the same value, and determining failed authentication if the first authentication key, the second authentication key, and the third authentication key have different values.

15. The method of claim 9, wherein the generating of the first authentication key, the second authentication key, and the third authentication key comprises generating the first authentication key, the second authentication key, and the third authentication key if the application program is installed or if a user selection is received.

16. A mobile platform security method using a non-transitory processor for authenticating a function of an application program in a mobile communication terminal, the method comprising:
   generating a first authentication key, a second authentication key, and a third authentication key, all of which are used to call the same function of an application program;
   identifying an identifier corresponding to the application program;
   registering the third authentication key and the identifier as a function parameter in the application program;
   storing the second authentication key in a secret domain of a memory storage of the mobile communication terminal;
   retrieving the third authentication key and the identifier if the application program calls the function;
   determining the first authentication key and the second authentication key corresponding to the identifier;
   executing an authentication operation using two authentication keys among the first authentication key, the second authentication key, and the third authentication key;
   comparing the authentication operation result with the remaining authentication key;
   permitting access to the called function if the three authentication keys correspond to one another; and
   denying access to the called function if the three authentication keys do not correspond to one another.

* * * * *